United States Patent
Peters

[15] 3,699,205
[45] Oct. 17, 1972

[54] PROCESSES OF PRODUCING STABLE FILAMENTS OF LINEAR POLYURETHANES

[72] Inventor: Timothy Victor Peters, Route 2, Rockaway Road, Lebanon, N.J. 08833

[22] Filed: April 3, 1970
[21] Appl. No.: 22,142

Related U.S. Application Data

[63] Continuation of Ser. No. 345,976, Feb. 19, 1964, abandoned.

[52] U.S. Cl. ............264/210 F, 28/72.17, 264/184, 264/230, 264/231, 264/235, 264/342 RE
[51] Int. Cl. ...............................D01d 5/12
[58] Field of Search ....264/210 Z, 184, 342 RE, 346, 264/230, 231; 260/75; 28/72.17, 235; 34/162

[56] References Cited

UNITED STATES PATENTS

| | | | |
|---|---|---|---|
| 1,986,106 | 1/1935 | Gibbons et al. | 264/347 |
| 2,957,852 | 10/1960 | Frankenburg et al. | 260/75 |
| 3,047,909 | 8/1962 | Boyer | 264/342 |
| 3,097,192 | 7/1963 | Schilit | 260/75 |
| 3,154,613 | 10/1964 | Epstein et al. | 264/184 |
| 3,227,793 | 1/1966 | Cipreani | 264/210 Z |
| 3,339,000 | 8/1967 | Vance | 264/184 |
| 3,402,236 | 9/1968 | Goodwin | 264/210 Z |

FOREIGN PATENTS OR APPLICATIONS 916,287  1/1963  Great Britain

*Primary Examiner*—Jay H. Woo
*Attorney*—Ryder, McAulay and Hefter

[57] ABSTRACT

Mechanically stable wet spun linear polyurethane are produced by extruding a linear polyurethane polymer solution to form a filament, passing the formed filament through at least one extraction bath to remove solvent therefrom at sufficiently high rate to effect a draw ratio of at least 1.1 and heating the extracted filament to a temperature above the second order of transition temperature and below the melting point of the linear polyurethane of the filament for a period sufficient to substantially completely relax the longitudinal stresses contained in the filament.

4 Claims, 1 Drawing Figure

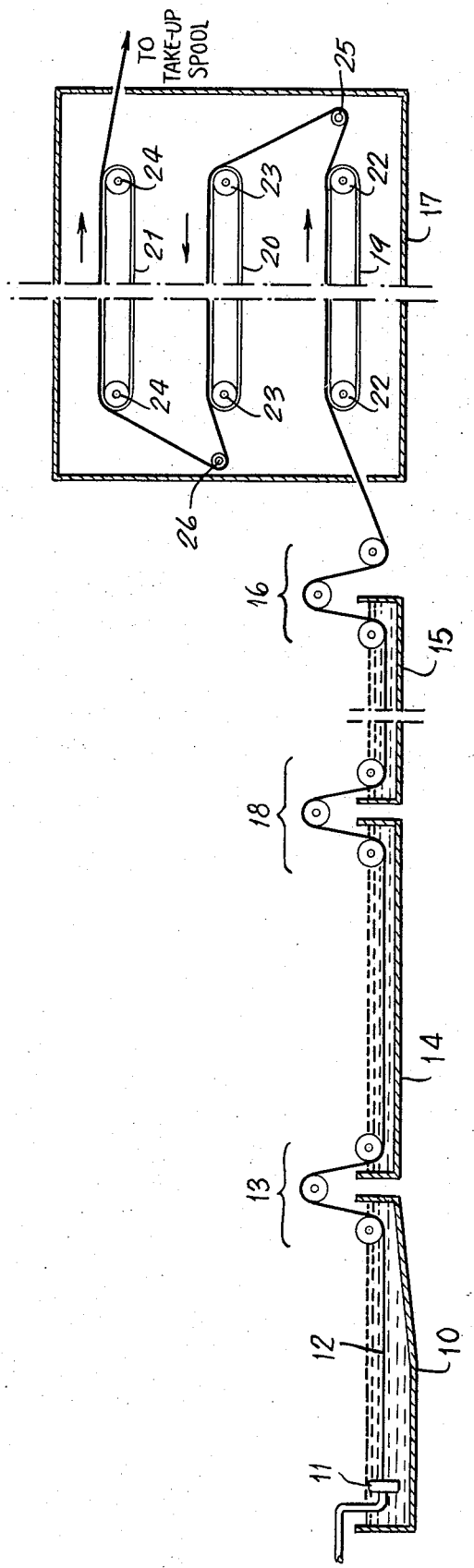

PROCESSES OF PRODUCING STABLE FILAMENTS OF LINEAR POLYURETHANES

This is a continuation of Ser. No. 345,976, filed Feb. 19, 1964 and now abandoned.

This invention relates to the production of stable filaments of linear polyurethanes.

The wet-spinning process for producing filaments has long been recognized as a difficult and, at best, erratic technique, when applied to the production of substantially linear polyurethane filaments. [See for example Rinke, H. *Angewandt Chemie* (*Eng. Ed.*) 1, pp. 419–424, 1962.] Minor changes in draw ratios and drying conditions often result in major changes in filament properties or even in complete inoperability. Best results have generally been obtained when draw conditions in the coagulation and extraction baths are at absolute minima. Such conditions, however, are not conducive to commercially attractive spinning rates, since hydrodynamic drag does not permit rapid passage of low modulus elastomeric fibers through liquid media and over guiding surfaces without appreciable draw.

In accordance with this invention, mechanically stable filaments comprising substantially linear polyurethanes are produced by wet-spinning processes. The longitudinal stresses which are created in a filament comprising linear polyurethane produced in a wet-spun process operated at high speed are relaxed by heating such mechanically metastable filament to a temperature above the second order transition temperature of the linear polyurethane and below the melting point of such polyurethane. The period of time during which the filament is heated should be sufficient to reorient the molecules of the polyurethane to substantially completely relax the longitudinal stresses. For efficient operation at a relatively high spinning rate, it is desirable to have a draw ratio in the extraction system of at least 1.1 and preferably within the range of 1.5 and 3. The draw ratio could be increased to the order of 7 but breakage of filaments would probably occur. The greater the draw ratio, the greater is the longitudinal stress in the resulting filament. These longitudinal stresses are substantially completely removed by the heat treatment described. The period of heat treatment is inversely related to the temperature of treatment.

The filaments of linear polyurethanes may be heated to any temperature in the range from the second order transition temperature to below the melting point of the polyurethane. This temperature range varies with the particular polyurethane selected. The second order transition temperature is usually 110° to 150° C. and the melting point is generally of 200° to 250° C.

For a given temperature of heat treatment, the minimum time required to effect substantially complete relaxation of stresses may be determined by heating filament samples from the extraction system at the selected oven temperature for increasing periods of time. The filaments may then be tested for some stress-dependent property such as the force required to cause a 300 percent elongation. This stress-dependent property approaches a limiting value with increasing time. The time required to reach substantially this value is the minimum time required in the process to effect substantially complete stress relaxation. Similarly, for a given time the minimum temperature required to effect substantially complete stress relaxation is determined by preparing samples by heating to increasing temperatures for the selected time.

Conveniently, a continuous dryer such as a belt type employing a draw not to exceed about 1.2 and preferably at 0.90 to 0.95 is utilized for conducting heat treatment. This draw in the continuous dryer relates to the draw in the dryer per se., using the output of the extraction system as one. This draw if slightly over 1 does not effect significantly the development of any additional longitudinal stresses in the filament.

This invention is applicable to any linear polyurethane which develops longitudinal stresses when drawn, such as those disclosed in the copending application of T.V. Peters, Ser. No. 340,548, filed Jan. 27, 1964.

A more comprehensive understanding of this invention is obtained by reference to the accompanying schematic drawing.

In the apparatus represented in the schematic drawing, a solution of the desired linear polyurethane is extruded into a coagulation bath 10 through spinnerette 11 where it coagulates to form the filament 12 which is removed from the bath by transfer roll set 13 and conducted to the first extraction bath 14. A multiplicity of extraction baths is normally employed, the exact number being dependent on such factors as: the desired level of residual solvent in the filament, the particular linear polyurethane being extruded, the bath temperature and the spinning rate. Suitable transfer means, such as roll sets 13 and 18, are provided between each consecutive bath. After leaving the final extraction bath 15 over transfer roll set 16 the filament is conducted to a multiple pass continuous dryer 17.

In the wet spinning of filaments of polyurethane, the draw ratio between any two guiding surfaces, such as roll set 13 and the corresponding roll set 18 which effects thread transfer from the first to second extraction bath or between rolls in a set, is made sufficiently high to overcome hydrodynamic drag and to prevent erratic filament movement. In general, the required draw ratio is 1.05 or more and results in a total draw in excess of 1.5 over the entire extraction train. The total draw ratio as described herein means the ratio between the last transfer roll set 16 and the first roll of the transfer roll set 13. The draw ratio is obtained by controlling the relative speeds of the various rolls. For example, if a draw ratio of 1.5 were used in the method illustrated, the surface speed of the transfer roll set 16 would be 50 percent greater than that of the first roll of the transfer roll set 13.

Filaments at the output of transfer roll set 16 are metastable with respect to both dimensions and mechanical properties. Properties in general are also quite erratic. Exposure to boiling water or hot dry conditions produces high shrinkages and significant changes in mechanical properties. Drying under tension often causes complete rupture of the filament.

The metastable filaments produced are stabilized by transferring them to a continuous dryer such as the belt-type dryer 17 at a draw not to exceed about 1.2 and preferably at 0.90 to 0.95 or lower if a draw in excess of 1.5 is employed in the extraction system. The filaments are then heated to a temperature at least in excess of the second order transition temperature of the particular polymer composition used.

The dryer 17 which may be heated by any convenient source, such as infrared lamps or indirect steam heat, includes a plurality of conveyor belts 19, 20 and 21, of any suitable flexible material such as stainless steel or polytetrafluoroethylene impregnated glass fabric, upon which the filaments pass from the set of rolls 16. Pairs of rollers 22, 23 and 24 are associated respectively with and drive the conveyor belts 19, 20 and 21. Transfer roller 25 transfers the filament from conveyor belt 19 to conveyor belt 20, while transfer roller 26 transfers the filament from conveyor belt 20 to conveyor belt 21.

In a belt-type dryer 17 this is done by using the three pass system shown and applying maximum heat on the final pass. A similar effect can also be obtained in a can-type or other type of dryer. It is preferable to first dry residual solvent and moisture from the fiber and then subject it to the temperature zone above the second order transition temperature of the particular polymer.

The practice of this invention is further illustrated by reference to the following example:

EXAMPLE 2,400 g. (1.2 moles) of dry 2,000 molecular weight polyneopentyladipate glycol was placed in a 4-liter resin pot with 300 g. (0.3 mole) of a dry 1,000 molecular weight polypropyleneether glycol and 750 g. (3.0 moles) of methylenebis(paraphenylisocyanate). The mixture was blanketed with nitrogen to prevent absorption of atmospheric moisture and stirred continuously at a moderate shear rate during the entire reaction. Using an electric heating mantle, the temperature was increased slowly (about 0.5° C. per minute) from room temperature to about 70° C. at which point the electric current was turned off. At 60°–70° C. an exotherm occurred which raised the final reaction temperature to about 100° C. The mantle insulation maintained the temperature at 95°–100° C. for about 45 minutes before beginning to drop appreciably. This allowed sufficient time for complete reaction to occur. At about 80° C., 750 ml. of dry dimethylformamide was added and mixed thoroughly to reduce the prepolymer viscosity to a level convenient for pouring. The prepolymer was then stored in bottles under a nitrogen blanket until ready for use.

Four liters of dimethylformamide and 7.9 g. (0.055 mole) of methyliminobispropylamine were mixed in an 8-liter stainless steel beaker and prepolymer was poured in continuously with very high shear rate until about 120 g. of prepolymer were added. Then 29.4 g. (0.490 mole) of anhydrous ethylenediamine was added together with 1.0 g. (0.01 mole) of diethanolamine and 2,000 ml. of dimethylformamide. Prepolymer was then added in a moderately fast, steady stream while mixing at a very high shear rate until the solution attained a viscosity of approximately 10 poises. Addition was then continued at a very slow rate until a viscosity of 60–80 poises was attained. At this point, 125 g. of a 50 percent dispersion of rutile titanium dioxide in dimethylformamide and 12.5 g. of 4,4'-butylidenebis(6-tert-butyl-m-cresol) sold under the trade name Santowhite Powder by Monsanto Chemical Co., were added and blended for 5 minutes. The resulting solution was ready for spinning and comprised about 18 percent polymer, 1 percent titanium dioxide, and 0.2 percent 4,4'-butylidenebis (6-tert-butyl-m-cresol).

The solution was supplied at a constant rate to the spinnerette 11 of apparatus shown schematically in the drawing. The filaments from the spinnerette were pulled away from the spinnerette face as a group and passed through the various baths contained in the baths 10, 14 and 15.

The coagulation bath consisted of a 20 percent solution of dimethylformamide in water at room temperature.

The extraction unit consisted of a total of eight stainless steel trays initially filled with water. The draw on the filaments in and out of the wash water was controlled by the speeds of the sets of rollers 13, 18 and 16 and others not shown, so that the final wash tank exit roll set 16 had a surface speed 1.5 times that of the first roll of the transfer roll set 13.

Inlets and outlets of wash water were arranged so that water flow was countercurrent to the filament motion for most efficient extraction.

After extraction the filaments were conducted to the belt 19 of three level dryer 17. Each dryer level 19, 20 and 21 was provided with a polytetrafluoroethylene impregnated glass fabric conveyor belt. The speed of all three belts was approximately 90 percent of the speed of the exit roll set 16 from the final extraction bath. Each belt was heated by infrared radiant heaters and had a heated length of about 9 feet. Temperatures at the bottom, middle, and top belts were 130° C., 160° C. and 190° C. respectively.

Filaments were taken from the final extraction bath and dried at 50° C. for 18 hours for comparison to filaments continuously dried and stress relaxed by passage through the infrared heater dryer at 40 feet per minute. Comparative properties are shown below.

| | Dried at 40° C. for 18 hours | Continuously dried at 40 fpm |
|---|---|---|
| Denier | 480 | 400 |
| Tenacity | 0.25 gpd | 0.61 gpd |
| Elongation | 300% | 575% |
| Stress at 300% elongation | 0.25 gpd | 0.16 gpd |

What is claimed is:

1. The process of continuously producing at a high speed a wet-spun substantially linear polyurethane filament comprising extruding a substantially linear polyurethane polymer solution to form a filament, said polyurethane polymer comprising the reaction product of (a) a glycol and diisocyanate prepolymer and (b) a diamine chain extender, passing the filament through at least one extraction bath to remove solvent from it, the draw of the filament through the bath being at least 1.1 and producing longitudinal stresses in the filament, and passing the filament continuously and at a high speed through a drying and heating zone to dry and heat the wet filament to a temperature above its second order transition temperature and below its melting point for a short period sufficient to reorient the molecules of the polyurethane filament and thereby to relax substantially completely the longitudinal stresses in the filament.

2. The process of claim 1 in which the filament is supported during its passage through said heating zone.

3. The process of claim 1 in which the draw of the filament in the extraction step is 1.1 to 5.

4. The process of claim 1 in which the unit length of the filament in the drying and heating step is 0.90 to 1.2 of the unit length of the filament after the extraction step.

* * * * *